(12) United States Patent
Lee et al.

(10) Patent No.: US 12,591,819 B2
(45) Date of Patent: Mar. 31, 2026

(54) SYSTEM AND METHOD FOR PROVIDING SERVICE BY USING MULTIPURPOSE VEHICLE

(71) Applicants: Hyundai Motor Company, Seoul (KR); Kia Corporation, Seoul (KR)

(72) Inventors: Sang Heon Lee, Seoul (KR); Dong Eun Cha, Hwaseong-si (KR); Jin Ho Hwang, Cheonan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 326 days.

(21) Appl. No.: 17/947,329

(22) Filed: Sep. 19, 2022

(65) Prior Publication Data

US 2023/0325728 A1     Oct. 12, 2023

(30) Foreign Application Priority Data

Apr. 12, 2022     (KR) ........................ 10-2022-0045349

(51) Int. Cl.
| | |
|---|---|
| *G06Q 10/02* | (2012.01) |
| *G06Q 10/047* | (2023.01) |
| *G06Q 50/40* | (2024.01) |
| *G08G 1/00* | (2006.01) |

(52) U.S. Cl.
CPC .......... *G06Q 10/02* (2013.01); *G06Q 10/047* (2013.01); *G06Q 50/40* (2024.01); *G08G 1/202* (2013.01)

(58) Field of Classification Search
CPC ...................................................... G06Q 10/02
See application file for complete search history.

(56) References Cited

U.S. PATENT DOCUMENTS

| | | | |
|---|---|---|---|
| 1,144,057 A | 6/1915 | Pearson et al. | |
| 11,164,273 B2 | 11/2021 | Heinla et al. | |
| 2017/0310770 A1* | 10/2017 | Samaan | .................. H04L 67/53 |
| 2018/0349872 A1* | 12/2018 | Ahmed | ............... G07G 1/0036 |
| 2020/0104761 A1* | 4/2020 | Aich | .................... G06Q 20/322 |
| 2021/0046888 A1* | 2/2021 | Vardharajan | .......... B60W 40/08 |
| 2021/0356959 A1 | 11/2021 | Ferguson et al. | |
| 2022/0410932 A1* | 12/2022 | Braunstein | ............ B60W 10/30 |

FOREIGN PATENT DOCUMENTS

KR     10-2022-0003398 A     1/2022

OTHER PUBLICATIONS

Ju Yeong Kwon, Spatial Components Guidelines in a Face-to-Face Seating Arrangement for Flexible Layout of Autonomous Vehicles, May 14, 2021 (Year: 2021).*

* cited by examiner

*Primary Examiner* — Ismail A Manejwala
(74) *Attorney, Agent, or Firm* — Morgan, Lewis & Bockius LLP

(57)     ABSTRACT
Introduced are a system and a method for providing a service by using a multipurpose vehicle, wherein a user, a service provider, and a multipurpose vehicle are matched, and a service of the matched service provider is provided to the matched user through the matched multipurpose vehicle, thereby enabling the user to simultaneously use the vehicle and the service.

19 Claims, 5 Drawing Sheets

SYSTEM AND METHOD FOR PROVIDING SERVICE BY USING MULTIPURPOSE VEHICLE

CROSS-REFERENCE TO RELATED APPLICATION(S)

This application is based on and claims the benefit of priority to Korean Patent Application No. 10-2022-0045349, filed on Apr. 12, 2022 in the Korean Intellectual Property Office, the disclosure of which is herein incorporated by reference in its entirety.

TECHNICAL FIELD

The present disclosure relates to a system and a method for providing a service by using a multipurpose vehicle, wherein a user and a service provider can be matched to a multipurpose vehicle such that the user is capable of simultaneously using the vehicle and a service.

BACKGROUND

Due to the spread and diversification of automobiles, a number of services using vehicles have appeared, such as services for a movement means to a destination, for example, taxi, bus, and driver-for-hire services and services for providing cargo transportation means, for example, courier services. In addition, recently, with the electrification of vehicles, the development of autonomous driving technology, and the emergence of multipurpose vehicles, many attempts are being made to reflect these changes in provision of services using vehicles.

However, a system for providing a service using a conventional vehicle has a problem in that a vehicle suitable for providing a specific service may provide only the specific service and may thus be limitedly used.

In other words, the user may select only a specific service, and the service provider has no choice but to provide the service through a vehicle that meets only the relevant purpose. Therefore, there is a problem in that the types of services capable of being provided through the vehicle are limited.

In addition, since most of current services are specialized only for transportation, the user may not efficiently use time while moving.

The above descriptions regarding background technologies have been made only to help understanding of the background of the present disclosure, and are not to be deemed by those skilled in the art to correspond to already-known prior arts.

SUMMARY

The present disclosure has been proposed to solve the above-mentioned problems, and an aspect of the present disclosure is to provide a system and a method for providing a service by using a multipurpose vehicle, wherein a user is not directly connected to a specific service provider but a platform provider, which is a system operator, matches a user and various service providers to a multipurpose vehicle through the system such that various services can be provided to the user through even one type of vehicle.

In accordance with an aspect of the present disclosure, a service providing system using a multipurpose vehicle may include: a user management unit configured to receive, from a user terminal, reservation information including at least one of a user, a service type, a boarding place, an alighting place, or a use time; and a service management unit configured to match the user, the service provider, and the multipurpose vehicle to each other through the reservation information, and provide a service of the matched service provider to the matched user through the matched multipurpose vehicle such that the user is capable of simultaneously using the vehicle and the service.

The service management unit may include: a provider management unit configured to match the user and the service provider to each other through the reservation information, and transmit service information including at least one of a service type or a service providing time to a terminal of the matched service provider; and a vehicle management unit configured to match the user, the service provider, and the multipurpose vehicle to each other through the reservation information and the service information, move the matched multipurpose vehicle to a service provider in the service information such that a service is capable of being prepared in the vehicle, move the multipurpose vehicle, in which the service is prepared, to the boarding place and the alighting place in the reservation information such that the user is capable of simultaneously using the vehicle and the service.

A service space in which the service is to be provided may be arranged in the multipurpose vehicle, and the service space may be changed depending on the type of service provided.

The system for providing a service by using the multipurpose vehicle may further include at least one hub configured to store multipurpose vehicles, such that, in the hub, the multipurpose vehicles may be maintained and/or repaired in the hub so as to be prepared to be provided again for a service.

The vehicle management unit may match the user, the service provider, and the hub to each other through the reservation information and the service information, may select at least one from among the multipurpose vehicles stored by the matched hub, and may move the selected multipurpose vehicle to a service provider in the service information such that a service is capable of being prepared in the vehicle.

The provider management unit may receive, from a terminal of at least one provider, provider information including at least one of the type or price of a service of the corresponding provider, may store the provider information, and may provide the provider information to the user terminal when the user makes a service reservation.

The vehicle management unit may perform movement route optimization including the optimization of a route along which the multipurpose vehicle moves to the service provider, the optimization of a route on which the multipurpose vehicle having the prepared service picks up the user, and the optimization of a route along which the vehicle having picked up the user moves to the alighting place, and may move the multipurpose vehicle along the optimized movement routes.

The vehicle management unit may determine, when the user requests a change of the alighting place while the service is provided, a new movement route reflecting the request, and may move the multipurpose vehicle along the new movement route when the degree of the movement route change is less than a threshold value.

The vehicle management unit may move the multipurpose vehicle along the new movement route by another user's consent when the degree of the movement route change according to the determined new movement route exceeds the threshold value.

The vehicle management unit may combine, with each other, multiple multipurpose vehicles in which services are prepared, and may allow the combined multipurpose vehicles to provide the services to users while sequentially moving to boarding places and alighting places in the reservation information.

The hub may provide a place for the multipurpose vehicles to gather when the vehicle management unit combines, with each other, the multiple multipurpose vehicles in which services are prepared, and the combination of the multipurpose vehicles may be made in the hub.

The vehicle management unit may perform movement route optimization including the optimization of a route along which the multipurpose vehicles, in which services are prepared, move to be combined with each other for providing the services through combined multipurpose vehicles and the optimization of a route along which the combined multipurpose vehicles pick up users, and may move the multipurpose vehicle along the optimized movement routes.

When a person attempts to board the vehicle, the vehicle management unit may determine whether the user in the reservation information received from the user management unit matches the person attempting to board, and may allow the person to board the vehicle when the user matches the person attempting to board.

The vehicle management unit may determine a user identification means of the user when determining whether the user in the reservation information matches the person attempting to board.

The user management unit may transfer an arrival schedule notification to the user terminal before the multipurpose vehicle arrives at the boarding place in the reservation information such that the user is capable of preparing for boarding.

A method for operating a service providing system using a multipurpose vehicle, according to the present disclosure, may include: receiving, by a user management unit, reservation information including at least one of a user, a service type, a boarding place, an alighting place, or a use time from a user terminal; matching, by a provider management unit, a user and a service provider to each other through the reservation information from the user management unit; transmitting, by the provider management unit, service information including at least one of a service type or a service providing time to a terminal of the matched service provider; matching, by a vehicle management unit, the user, the service provider, and the multipurpose vehicle to each other by using the reservation information from the user management unit and the service information from the provider management unit; and moving, by the vehicle management unit, the matched multipurpose vehicle to a service provider in the service information such that a service is capable of being prepared in the vehicle, and moving the multipurpose vehicle, in which the service is prepared, to a service providing place in the reservation information to allow the user to simultaneously use the vehicle and the service.

In the matching of the user, the service provider, and the multipurpose vehicle, the vehicle management unit may match the user, the service provider, and a hub to each other through the reservation information and the service information, and may select at least one from among multipurpose vehicles stored by the matched hub.

In the allowing of the user to simultaneously use the vehicle and the service, the vehicle management unit may perform movement route optimization including the optimization of a route along which the multipurpose vehicle moves to the service provider, the optimization of a route on which the multipurpose vehicle having the prepared service picks up the user, and the optimization of a route along which the vehicle having picked up the user moves to the alighting place, and may move the multipurpose vehicle along the optimized movement route.

In the allowing of the user to simultaneously use the vehicle and the service, the vehicle management unit may combine, with each other, multiple multipurpose vehicles in which services are prepared, and may allow the combined multipurpose vehicles to provide the services to users while sequentially moving to boarding places and alighting places in the reservation information.

The allowing of the user to simultaneously use the vehicle and the service may include: determining, by the vehicle management unit, whether the user in the reservation information received from the user management unit matches a person attempting to board the vehicle when the person attempts to board the vehicle; and allowing, by the vehicle management unit, the person to board the vehicle when the user matches the person attempting to board as a result of the determination.

According to a system and a method for providing a service by using a multipurpose vehicle according to the present disclosure, a user may perform various desired activities inside the multipurpose vehicle while moving by the vehicle, and thus efficiently utilize the movement time. In addition, a service provider may expand the demand for services according to the new service providing method, and may expect to increase their profits by reducing fixed costs including store rent, etc. By satisfying the demand of the user and service provider, a platform provider, which operates the system, may charge a fee based on providing multipurpose vehicles and matching the user and the service provider to each other.

Advantageous effects obtainable from the present disclosure may not be limited to the above mentioned effects, and other effects which are not mentioned may be clearly understood, through the following descriptions, by those skilled in the art to which the present disclosure pertains.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

A specific structural or functional description of embodiments of the present disclosure set forth in the specification or application is given merely for the purpose of describing the embodiment according to the present disclosure. Therefore, the embodiments according to the present disclosure may be implemented in various forms, and the present disclosure should not be construed as being limited to the embodiments described in the specification or application. Hereinafter, embodiments of the present disclosure will be described in detail with reference to the accompanying drawings.

Figure 1:
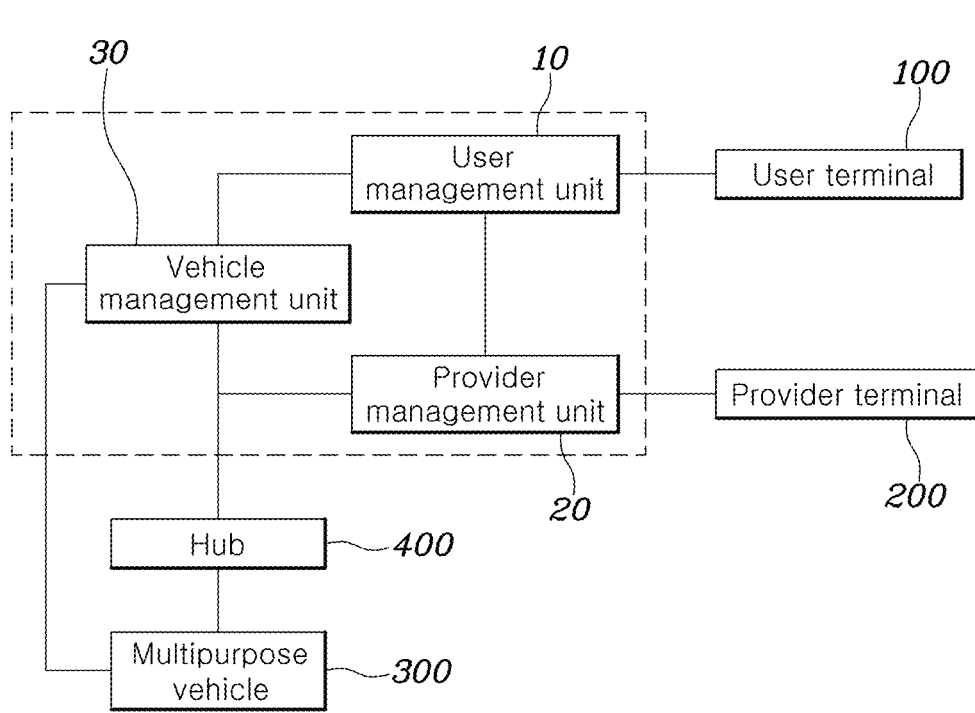
FIG. 1 illustrates elements of a service providing system using a multipurpose vehicle according to an embodiment of the present disclosure.
Figure 2:
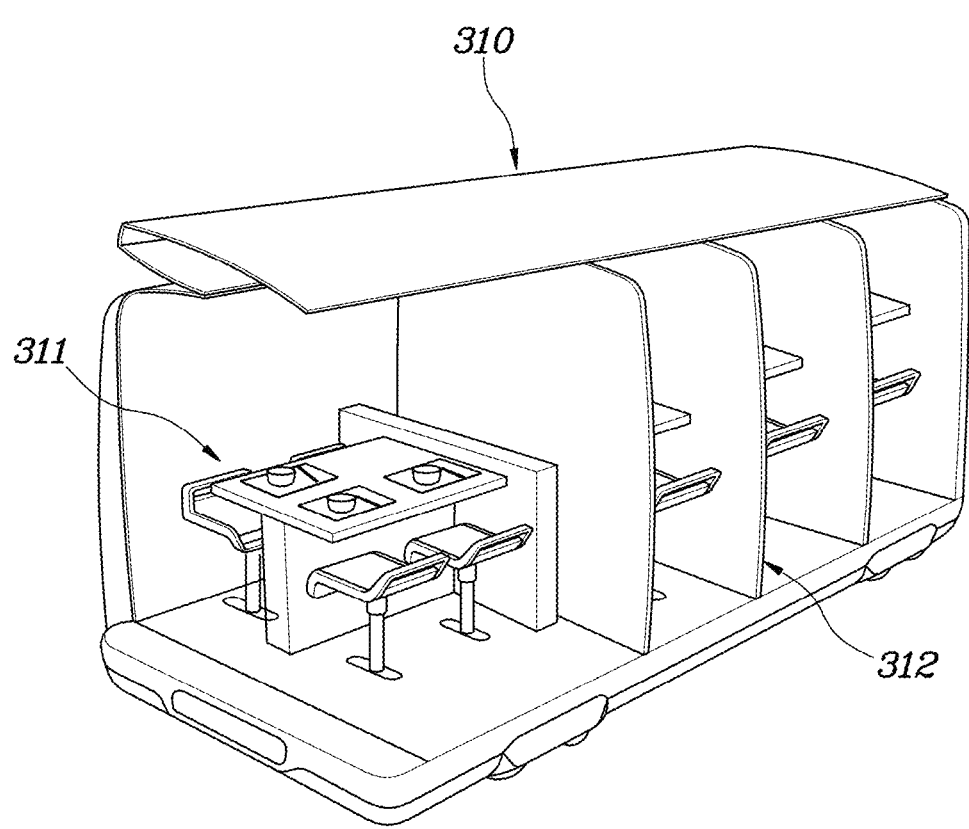
FIG. 2 illustrates the inner space of a multipurpose vehicle in which a service is prepared according to an embodiment of the present disclosure.
Figure 3:
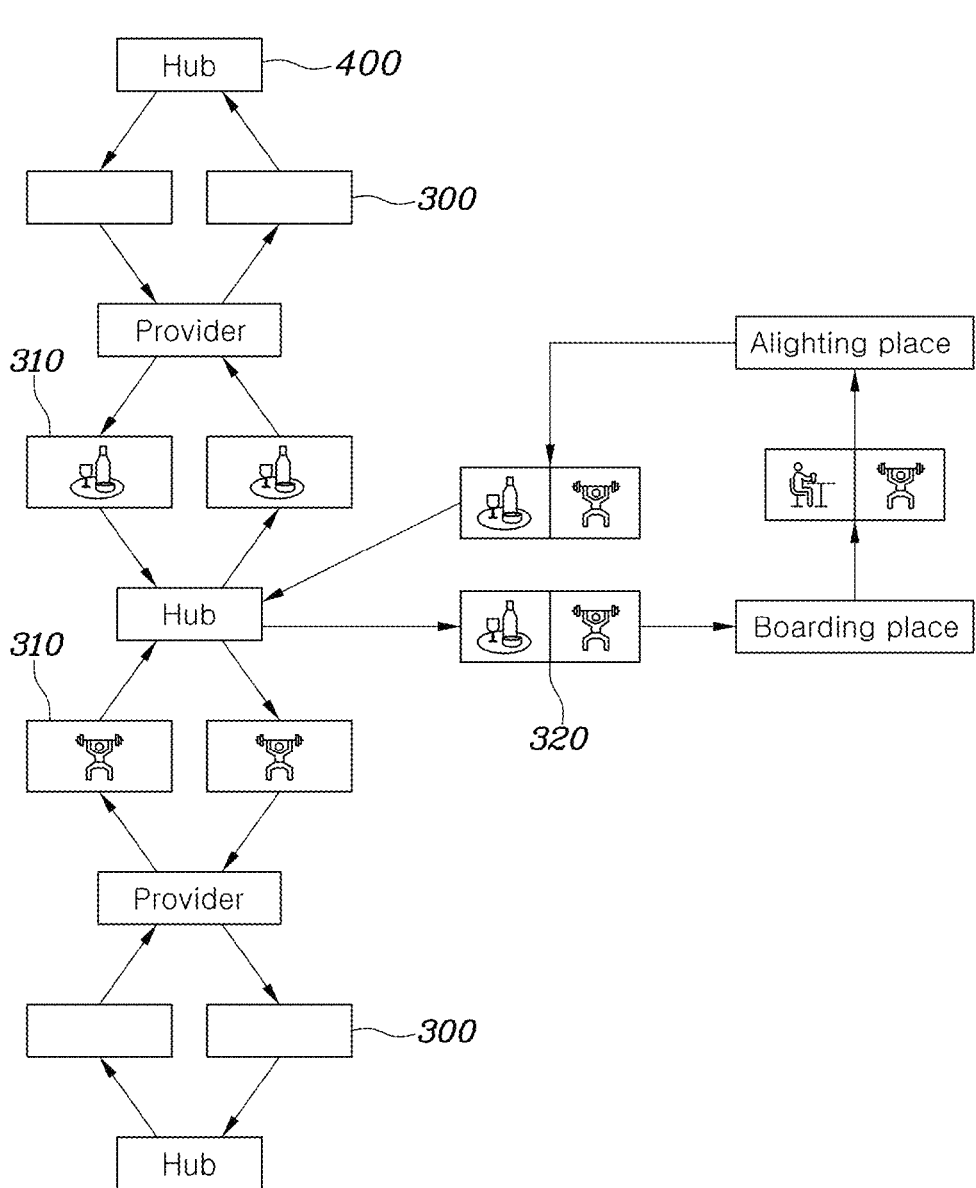
FIG. 3 illustrates a movement route of a multipurpose vehicle according to an embodiment of the present disclosure.
Figure 4A:
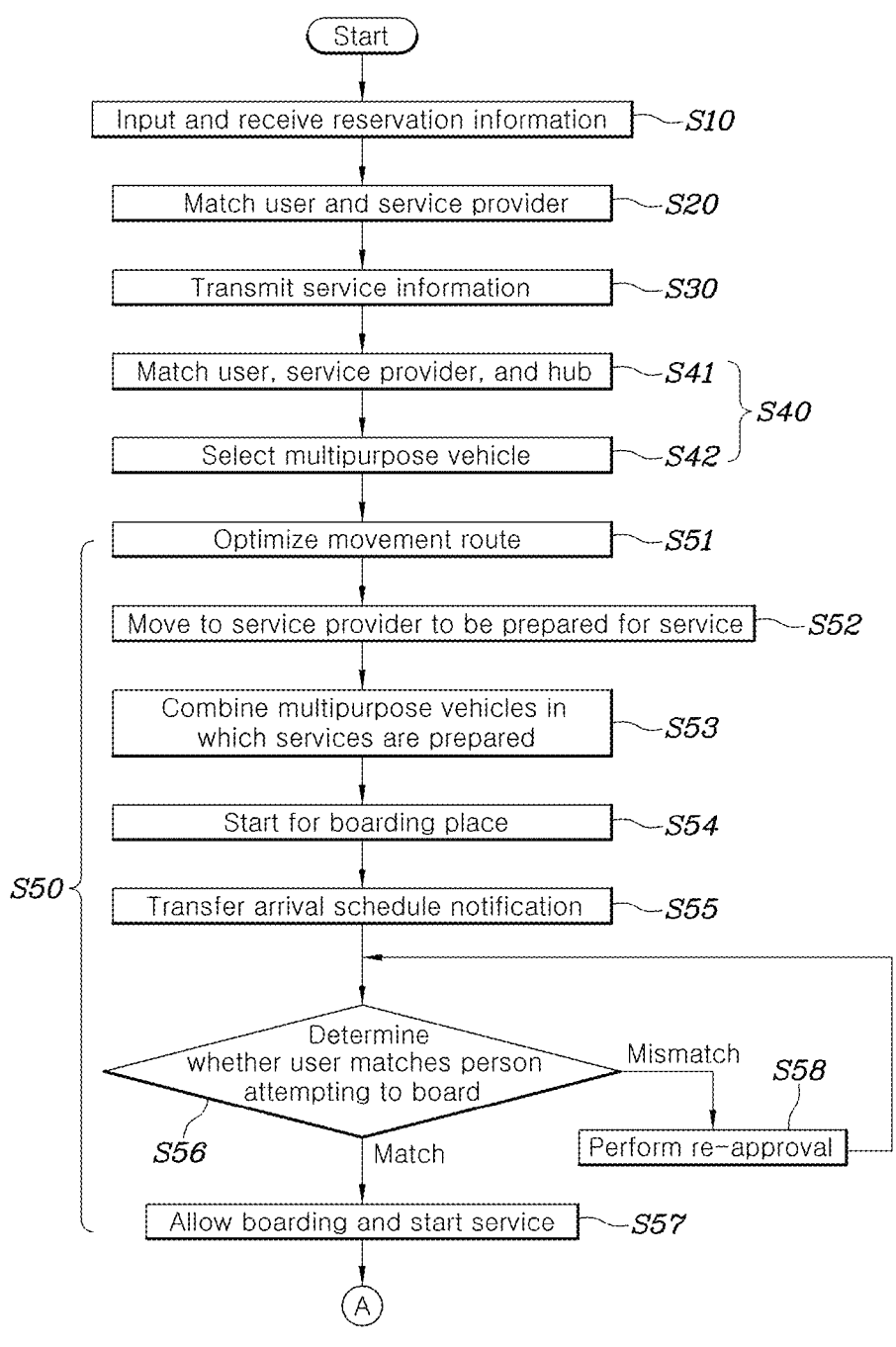
FIGS. 4A and 4B are flowcharts illustrating a service providing method using a multipurpose vehicle according to an embodiment of the present disclosure.
Figure 4B:
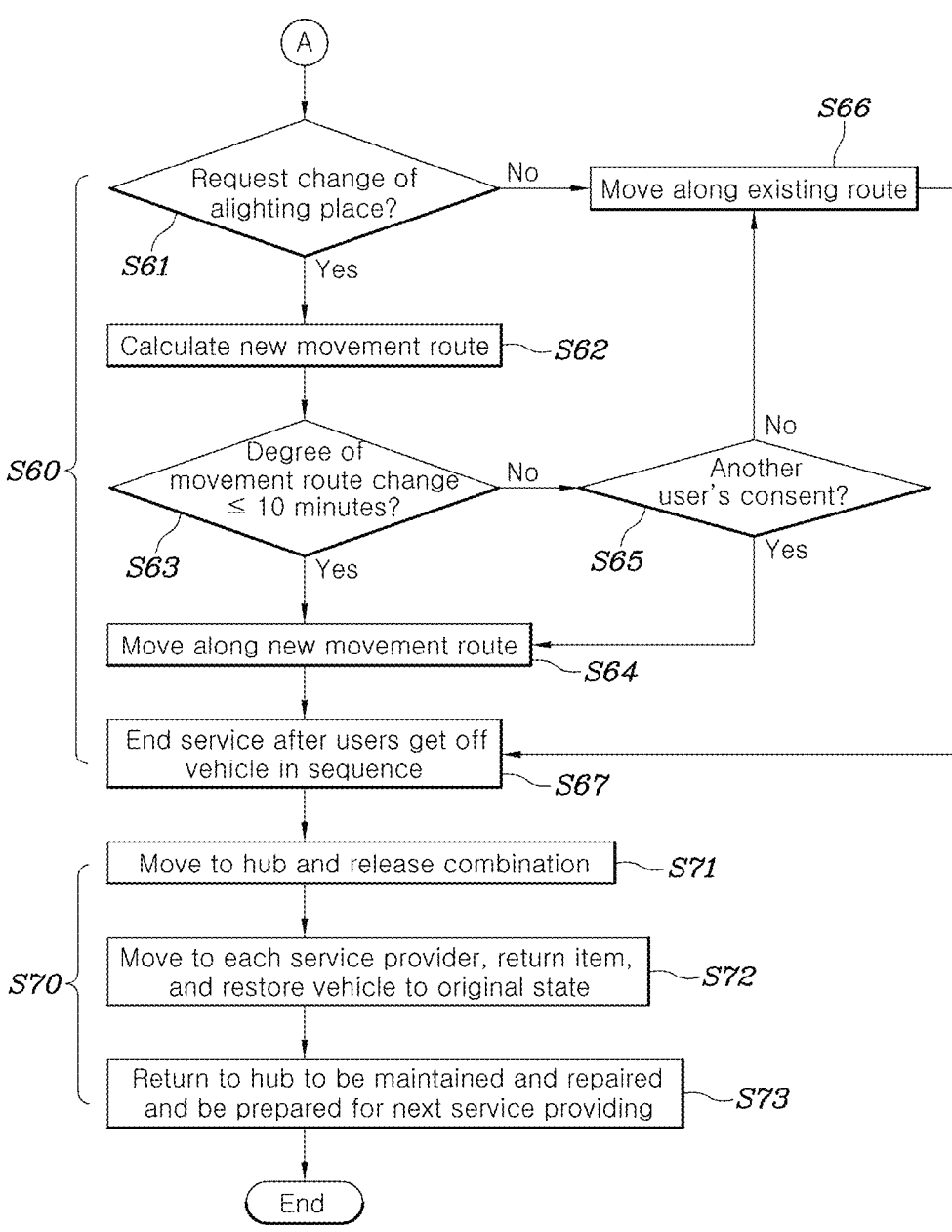

FIG. 1 illustrates elements of a service providing system using a multipurpose vehicle according to an embodiment of the present disclosure. FIG. 2 illustrates the inner space of a multipurpose vehicle in which a service is prepared according to an embodiment of the present disclosure. FIG. 3 illustrates a movement route of a multipurpose vehicle according to an embodiment of the present disclosure. FIGS. 4A and 4B are flowcharts illustrating a service providing method using a multipurpose vehicle according to an embodiment of the present disclosure.

FIG. 1 illustrates elements of a service providing system using a multipurpose vehicle according to an embodiment of the present disclosure. The service providing system of the present disclosure may include: a user management unit configured to receive, from a user terminal, reservation information including at least one a user, a service type, a boarding place, an alighting place, or a use time; and a service management unit configured to match a user, a service provider, and the multipurpose vehicle to each other through the reservation information, and provide a service of the matched service provider to the matched user through the matched multipurpose vehicle such that the user is capable of simultaneously using the vehicle and the service.

The service management unit may include: a provider management unit configured to match the user and the service provider to each other through the reservation information, and transmit service information including at least one of a service type or a service providing time to a terminal of the matched service provider; and a vehicle management unit configured to match the user and the service provider to a multipurpose vehicle through the reservation information and the service information, move the matched multipurpose vehicle to the service provider in the service information such that a service is capable of being prepared in the vehicle, and move the multipurpose vehicle having the prepared service to the boarding place or the alighting place in the reservation information such that the user is capable of simultaneously using the vehicle and the service.

The system may include: a user management unit 10 configured to receive, from a user terminal 100, reservation information including at least one of a user, a service type, a boarding place, an alighting place, or a use time; a provider management unit 20 configured to match the user and the service provider to each other through the reservation information, and transmit service information including at least one of a service type or a service providing time to a terminal 200 of the matched service provider; a vehicle management unit 30 configured to match the user and the service provider to a hub 400 with each other through the reservation information and the service information, select at least one from among multipurpose vehicles 300 stored by the matched hub, move the selected multipurpose vehicle to the service provider in the service information so as to allow a service to be prepared in the vehicle, and move a multipurpose vehicle 310, in which a service is prepared, to the boarding place and the alighting place in the reservation information such that the user is capable of simultaneously using the vehicle and the service; and at least one hub 400 configured to store the multipurpose vehicles 300 such that, in the hub 400, the multipurpose vehicles 300 may be maintained and/or repaired so as to be prepared to be provided again for a service.

The service providing system using the multipurpose vehicle, according to the present disclosure, may match the user, the service provider, and the multipurpose vehicle 300 to each other, and may enable the user to use a desired service while traveling after boarding the vehicle. To this end, an eco-friendly vehicle such as an electric vehicle may be appropriate for a vehicle applicable to the present disclosure. This is because the eco-friendly vehicle does not have an engine, etc., so the inner space of the vehicle may be used more widely, and the inner space is formed in the shape of a box, which is advantageous for installing and arranging service equipment, etc.

Services that can be provided through the multipurpose vehicle 300 may include various services, such as not only the provision of a simple movement means or the transportation of cargo, etc. but also a restaurant, a gym, an office, a conference hall, etc.

To this end, the multipurpose vehicle 300 applicable to the present disclosure has a form in which interiors or components can be freely arranged and exchanged. In the multipurpose vehicle 300, a dining table may be installed to serve food, a desk, etc. may be placed to allow a user to do work, and fitness equipment, etc. may be installed to allow the user do exercise. The above-mentioned utilization of the multipurpose vehicle of the present disclosure will be described later.

The user management unit 10, the provider management unit 20, and the vehicle management unit 30, which constitute the present disclosure, may be structured as respective servers to exchange information with each other through wireless communication, and may be constructed as a single central server. Furthermore, the vehicle management unit 30 may include not only a server but also a controller of the multipurpose vehicle 300 and the hub 400 described later.

In order to use a service of the present disclosure, first, a user may input reservation information including at least one of a user, a service type, a boarding place, an alighting place, or a use time through the user terminal 100. The user management unit 10 may receive the reservation information, and may transfer the reservation information to the provider management unit 20. The user may input information using his/her mobile device and an application, and the user management unit 10 constructed in a remote server may receive the information through wireless communication, etc.

Subsequently, the provider management unit 20 in the form of a server may receive the reservation information through the user management unit 10, may match the user to a service provider, among one or more service providers prestored in a database of a server, through the reservation information, and may transmit service information including a service type and a service providing time to the matched service provider terminal 200. The service provider may receive the service information by using a mobile device and an application, may determine, through the received service information, that the matching has been made, and may prepare a service to be provided.

The vehicle management unit 30 may match the user and the service provider to a multipurpose vehicle 300 through the received reservation information and the received service information, may move the matched multipurpose vehicle 300 to a service provider in the service information such that a service is prepared in the vehicle, and may move the multipurpose vehicle 310 having the prepared service to the boarding place or the alighting place in the reservation information such that the user is capable of receiving the service while moving.

In matching the user, the service provider, the multipurpose vehicle 300, the vehicle management unit 30 may determine selectable movement routes, and then determine the time taken for the multipurpose vehicle 300 to move the service provider and the time for the multipurpose vehicle 310, in which a service is prepared, to move to a boarding place, and may select and match the service provider and the multipurpose vehicle 300 such that the least time may be needed. In this way, the efficiency of the system may be ensured and the waiting time of users may be shortened.

When the matched multipurpose vehicle 300 arrives at the service provider, the service provider may install or arrange necessary items in the inner space of the multipurpose vehicle 300 such that a service may be provided according to service information. For example, when a user requests a restaurant service, the provider may install a table, a chair, etc. in the multipurpose vehicle 300 to provide ordered food or cook and provide food in real time during the movement of the multipurpose vehicle 300.

The service providing system using a multipurpose vehicle may additionally include at least one hub 400. The hub 400 may store multipurpose vehicles 300, and when a vehicle returns after providing a service, the vehicle may be prepared to be provided for the service again through maintenance and repair in the hub 400. To this end, the hub 400 may function as a base and a transfer point for vehicles, etc., and may include a faculty capable of storing multiple vehicles and a faculty for maintenance and repair including refueling or charging of vehicles.

Multiple multipurpose vehicles 300 may be integrally managed through the hub 400, the hub 400 may be efficient in terms of management, and may allow the vehicle 300 to maintain a predetermined quality. Furthermore, through this, a multipurpose vehicle 300 to be used for providing a service may be easily identified, and the occurrence of a disruption in service providing due to a poor condition of the multipurpose vehicle 300 may be reduced, thereby helping to maintain the circulation of the system.

The vehicle management unit 30 may match a user and a service provider to a hub 400 instead of directly matching the user and the service provider to the multipurpose vehicles 300, and may select at least one from among the multipurpose vehicles 300 stored by the matched hub 400 and allow the selected multipurpose vehicle to be used for service providing.

The provider management unit 20 may receive, from a terminal 200 of at least one provider, provider information including at least one of the type or price of a service from the provider, and may store the received provider information in, e.g., a database of a server. Subsequently, when a user makes a service reservation, the provider information may be provided to a user terminal 100 so that the user may obtain information such as a service type, a service price, reviews, etc., and may select a service provider according to his/her preference.

The vehicle management unit 30 may optimize a movement route including a route along which a multipurpose vehicle 300 moves to a provider service, a route along which a multipurpose vehicle 310, in which a service is prepared, picks a user, and a route along which the vehicle having picked up the user moves to an alighting place, and may move the multipurpose vehicle 300 to move along the optimized movement route. At this time, a driver himself/ herself may drive the vehicle along the optimized movement route, or the vehicle may be allowed to be autonomously driven. The optimization of the movement route may be performed by reflecting a movement distance, a moving time, a time needed for provision of services, etc., and enables the movement time to be adjusted as necessary.

When a user makes a request for changing an alighting place while receiving a service on board, the vehicle management unit 30 may determine a new movement route reflecting the request, and may move the multipurpose vehicle 300 along the new movement route when the degree of change of a movement route is less than a threshold value.

When the degree of change of a movement route exceeds the threshold value, the vehicle management unit 30 may move, by another user's consent, the multipurpose vehicle 300 along the new movement route.

The degree of change of a movement route may include the degree of change of an estimated arrival time, the degree of change of a traveling distance, etc. For example, if the estimated time of arrival when a vehicle moves along the new movement route is delayed by less than 10 minutes from the estimated time of arrival when the vehicle moves along an existing route, the vehicle may be allowed to move along the new movement route. If the estimated time of arrival when a vehicle moves along the new movement route is delayed by more than 10 minutes from the estimated time of arrival when the vehicle moves along the existing route, the vehicle may be allowed to move along the new movement route only when other users' consent is obtained.

In obtaining other users' consent, consent may be obtained from all of users other than a user requesting an alighting place change. However, movement along the new movement route may be performed through consent of only some users whose estimated arrival times, etc. are changed due to the alighting place change.

As described above, the service providing system may be flexibly operated by allowing an alighting place to be changed while providing a service, and the inconvenience of other users may be prevented by limiting the alighting place change.

The vehicle management unit 30 may combine multipurpose vehicles 310, in which services are prepared, with each other and may allow a combined multipurpose vehicle 320 to provide a service to users while sequentially moving a boarding place and an alighting place in the reservation information.

The combination of the multipurpose vehicles 300 may be performed by mechanical coupling of components for combination, magnetic force, etc. Furthermore, the combination may be performed in such manner that the multipurpose vehicles 300 perform platooning while sharing a movement route and a speed without direct coupling therebetween.

Through the combination of the multipurpose vehicles 300, limitations on the area of vehicle inner space, the number of people accommodated may be overcome, thereby further expanding users' service options, and services may be simultaneously provided to separate users, thereby reducing costs added by separately providing the services for the respective users, and thus ensuring more profit.

When the vehicle management unit 30 combines the multipurpose vehicles 310 in which services are prepared, the hub 400 may provide a place in which the multipurpose vehicle 300 are collected together, and a combination of the multipurpose vehicles 300 may be performed in the hub 400.

When services are provided through the combined multipurpose vehicles 320, the vehicle management unit 30 may optimize a movement route including a route along which multipurpose vehicles 310, in which services are prepared, move to be combined with each other, and a route along which combined multipurpose vehicles 320 pick up users, and may move the multipurpose vehicles 300 along the optimized movement route.

For example, when the combination of multipurpose vehicles 300 is made in the hub 400, the movement route may be optimized so that multipurpose vehicle 300 move to a hub 400 closest to each service provider and a boarding place and are combined.

When a user attempts to board a vehicle, the vehicle management unit 30 may determine whether the user attempting to board matches the user in the reservation information received from the user management unit 10, and may allow boarding the vehicle when the user attempting to board matches the user in the reservation information.

At this time, the vehicle management unit 30 may determine a user identification means of the user to determine whether the user attempting to board matches the user in the reservation information. The user identification means may be a fingerprint, face recognition, approval text, a QR code, an identification card, etc.

Through the determination procedure, a person other than the user may be prevented from boarding the multipurpose vehicle 300.

The user management unit 10 may transfer an arrival schedule notification to the user terminal 100 before the multipurpose vehicle 300 arrives at the boarding place in the reservation information. The arrival schedule notification may be made through the user terminal 100 and the application, and may transfer information such as an estimated arrival time and the type of a reserved service. A user, who has received the arrival schedule notification, may prepare for boarding in advance before the arrival of the vehicle, and may determine whether the service according to the reservation information is prepared.

FIG. 2 illustrates the inner space of a multipurpose vehicle in which a service is prepared according to an embodiment of the present disclosure. A multipurpose vehicle 310 in which a service is prepared may include a table and tableware 311 for providing a restaurant service and an inner temporary wall 312.

A service space for providing a service may be provided in a multipurpose vehicle 300, and the service space may be changed depending on the type of service provided.

In FIG. 2, the table and tableware 311 for providing a restaurant service are illustrated in the vehicle 310 in which a service is prepared, and may be changed depending on the type of service provided. When a service provided is an exercise place providing service, exercise equipment, etc. may be arranged. When a service provided is a theater-providing service, a beam projector and a screen may be arranged.

The number of inner temporary walls 312 illustrated in FIG. 2 may be increased or decreased as necessary, and the position thereof may be adjusted as necessary. Thus, the service space in the multipurpose vehicle 300 may be flexibly adjusted depending on the type of service provided. Further, the inner temporary wall 312 may be formed of a transparent material such as glass, and may be used for space separation in various ways.

When a multipurpose vehicle 300 arrives at a service provider, the service provider may perform preparation for providing a service through the vehicle by installing or arranging, in the vehicle, items, etc. necessary for provision of the service, or putting staff necessary for provision of the service in the vehicle.

The inner space of the multipurpose vehicle 300 may be divided into separate spaces according to reservation information, and the inner space may be substantially extended through a combination of multipurpose vehicles 300.

Since the service space of a vehicle may be changed, one vehicle may be used to provide various services. Further, the number of users, who can be simultaneously provided with a service, may also be adjusted through the separation and extension of a space. By changing the inner space, more types of providable services may be ensured, a service may be simultaneously provided to separate users, thereby increasing profits, and a premium service, such as providing more comfortable service using a wide space, may be provided.

FIG. 3 illustrates a movement route of a multipurpose vehicle according to an embodiment of the present disclosure. FIG. 3 illustrates a route along which, after users, service providers, and hubs 400 are matched to each other through reservation information and service information, multipurpose vehicles 300 selected by each hub 400 move to corresponding service providers such that the providers prepare reserved services in the multipurpose vehicles 300, a route along which multipurpose vehicles 310, in which the services are prepared, move to the hubs 400 so as to be combined, a route along which combined multipurpose vehicles 320 move to a boarding place to pick the users, a route along which the combined multipurpose vehicles 320 move to an alighting place to provide the services, a route along the combined multipurpose vehicles 320 return to the hub 400 after the provision of the services is completed, are released from the combination, move to the respective service providers and are restored to the original state, and then return again to each hub 400.

FIGS. 4A and 4B are flowcharts illustrating a service providing method using a multipurpose vehicle according to an embodiment of the present disclosure. FIGS. 4A and 4B may be considered to be one flowchart in which FIGS. 4A and 4B are connected with each other.

A service providing method of the present disclosure may include a step S10 in which a user management unit 10 receives, from a user terminal 100, reservation information including at least one of a user, a service type, a boarding place, an alighting place, or a use time; a step S20 in which a provider management unit 20 matches the user to a service provider through the reservation information from the user management unit 10; a step S30 in which the provider management unit 20 transmits service information including at least one of a service type or a service providing time to a terminal 200 of the matched service provider; a step S40 in which a vehicle management unit 30 matches the user and the service provider to a multipurpose vehicle 300 by using the reservation information from the user management unit 10 and the service information from the provider management unit 20; a step of S50 in which the vehicle management unit 30 moves the matched multipurpose vehicle 300 to a service provider in the service information such that a service is capable of being prepared in the vehicle, and moves a multipurpose vehicle 310 having the prepared service to a service providing place in the reservation information such that the user is capable of simultaneously using the vehicle and the service; a step S60 of moving to an alighting place and terminating the service after the user gets off in sequence; and a step S70 of preparing a next service after the end of service providing.

The step S40 in which the vehicle management unit 30 matches the user and the service provider to the multipurpose vehicle 300 by using the reservation information from the user management unit 10 and the service information from the provider management unit 20 may include a step S41 of matching the user and the service provider to the hub 400 instead of directly matching the user and the service provider to the multipurpose vehicle 300; and a step S42 of selecting at least one from among multipurpose vehicles 300 stored by the hub 400 through the reservation information and the service information.

The step S50 in which the vehicle management unit 30 moves the matched multipurpose vehicle 300 to a service provider in the service information such that a service is capable of being prepared in the vehicle, and moves a multipurpose vehicle 310, in which the service is prepared, to a service providing place in the reservation information such that the user is capable of simultaneously using the vehicle and the service may include a step 51 of optimizing a route along which the multipurpose vehicle 300 moves to the service provider, a route along which the multipurpose vehicle 310 in which the service is prepared, picks the user, and a route along which the vehicle having picking up the user moves to an alighting place, and moving the multipurpose vehicle 300 along the optimized movement routes.

A driver himself/herself may drive the vehicle along the optimized movement routes, and the vehicle may receive a movement route and may be autonomously driven.

The step S50 in which the vehicle management unit 30 moves the matched multipurpose vehicle 300 to a service provider in the service information such that a service is capable of being prepared in the vehicle, and moves a multipurpose vehicle 310, in which the service is prepared, to a service providing place in the reservation information such that the user is capable of simultaneously using the vehicle and the service may include a step S53 in which the vehicle management unit 30 combines multipurpose vehicles 310 in which services are prepared, and allows a combined multipurpose vehicle 320 to provide a service to users while sequentially moving a boarding place and an alighting place in the reservation information. Through the combination of the multipurpose vehicles 300, multiple services may be simultaneously provided, thereby ensuring the possibility of a user's choice, and a service may be simultaneously provided to multiple users, thereby reducing costs added by separately providing the service, and ensuring an additional profit.

The step S50 in which the vehicle management unit 30 moves the matched multipurpose vehicle 300 to a service provider in the service information such that a service is capable of being prepared in the vehicle, and moves a multipurpose vehicle 310, in which the service is prepared, to a service providing place in the reservation information such that the user is capable of simultaneously using the vehicle and the service may include a step S55 in which the user management unit 10 transfers an arrival schedule notification to the user terminal 100 before the multipurpose vehicle 300 arrives at a boarding place in the reservation information. The user having received the arrival schedule notification may prepare for boarding in advance before the arrival of the vehicle.

The step S50 in which the vehicle management unit 30 moves the matched multipurpose vehicle 300 to a service provider in the service information such that a service is capable of being prepared in the vehicle, and moves the multipurpose vehicle 310 in which the service is prepared to a service providing place in the reservation information such that the user is capable of simultaneously using the vehicle and the service may include: a step S56 in which when a user attempts to board the vehicle, the vehicle management unit

30 determines whether the user attempting to board matches the user in the reservation information received from the user management unit 10, and allows boarding the vehicle when the user attempting to board matches the user in the reservation information; and a step S58 of performing re-approval when the user attempting to board does not match the user in the reservation information (S58). Through the determination procedure, a person other than the user may be prevented from boarding the multipurpose vehicle 300.

The vehicle management unit 30 may determine a user identification means of the user when determining whether the user attempting to board matches the user in the reservation information. The user identification means may be a fingerprint, face recognition, approval text, a QR code, an identification card, etc.

The step S60 of moving to an alighting place and terminating the service after the user gets off in sequence may include: a step S63 in which when a user makes a request for changing an alighting place while receiving a service on board, the vehicle management unit 30 determines a new movement route reflecting the request and moves the multipurpose vehicle 300 along the new movement route when the degree of change of a movement route is less than a threshold value; and a step S65 in which when the degree of change of a movement route exceeds the threshold value, the vehicle management unit 30 moves the multipurpose vehicle 300 along the new movement route by another user's consent.

The degree of change of a movement route may include the degree of change of an estimated arrival time and the degree of change of a traveling distance. If the estimated time of arrival when a vehicle moves along the new movement route is delayed by less than 10 minutes from the estimated time of arrival when the vehicle moves along an existing route, the vehicle may be allowed to move along the new movement route.

The step S70 of preparing a next service after the end of service providing may include: a step S71 in which the combined multipurpose vehicle 320 moves to the hub 400 and is released from the combination; a step S72 in which the multipurpose vehicles 310, in which the services are prepared, move to the respective service provider and are restored to the original state; and a step S73 in which the multipurpose vehicle 300 returns to the hub 400 and are prepared for next service providing through maintenance and repair.

Although the present disclosure has been described and illustrated in conjunction with particular embodiments thereof as described above, it will be apparent to those skilled in the art that various improvements and modifications may be made to the present disclosure without departing from the technical idea of the present disclosure defined by the appended claims.

What is claimed is:

1. A service providing system using a multipurpose vehicle, the service providing system comprising at least one server configured to:

receive, from a user terminal, reservation information comprising at least one of a user, a service type, a boarding place, an alighting place, or a use time; and match the user, a service provider, and a multipurpose vehicle to each other through the reservation information, and to provide a service of the matched service provider to the matched user through the matched multipurpose vehicle such that the user is capable of simultaneously using the vehicle and the service, wherein the service provided by the matched service provider is performed inside the multipurpose vehicle, wherein the at least one server is further configured to:

match the user and the service provider to each other through the reservation information, and to transmit service information comprising at least one of a service type or a service providing time to a terminal of the matched service provider;

match the matched user and service provider to the multipurpose vehicle through the reservation information and the service information; and in response to receiving a three-party matching result involving the user, the service provider, and the multipurpose vehicle, control the matched multipurpose vehicle to move to the service provider in the service information, and subsequently control the matched multipurpose vehicle, in which the service is prepared, to move to the boarding place and the alighting place in the reservation information, such that the user is capable of simultaneously using the vehicle and the service.

2. The service providing system of claim 1, wherein a service space for providing the service is arranged in the multipurpose vehicle, and the service space is changeable depending on a type of service provided.

3. The service providing system of claim 1, further comprising at least one hub configured to store multipurpose vehicles, such that the multipurpose vehicles are maintained and/or repaired in the at least one hub so as to be prepared to be provided again for a service.

4. The service providing system of claim 3, wherein the at least one server is further configured to: match the user and the service provider to the at least one hub through the reservation information and the service information; select at least one from among the multipurpose vehicles stored by the matched hub; and to move the selected multipurpose vehicle to a service provider in the service information such that a service is capable of being prepared in the vehicle.

5. The service providing system of claim 1, wherein the at least one server is further configured to: receive, from a terminal of at least one provider, provider information including at least one of a type or a price of a service of the corresponding provider, and store the provider information; and provide the provider information to the user terminal when the user makes a service reservation.

6. The service providing system of claim 1, wherein the at least one server is further configured to: perform movement route optimization, which includes optimization of a route along which the multipurpose vehicle moves to the service provider, optimization of a route on which the multipurpose vehicle having the prepared service picks up the user, and optimization of a route along which the vehicle having picked up the user moves to the alighting place; and move the multipurpose vehicle along the optimized movement routes.

7. The service providing system of claim 1, wherein the at least one server is further configured to: determine, when the user requests a change of the alighting place while the service is provided, a new movement route reflecting the request; and move the multipurpose vehicle along the new movement route when a degree of the movement route change is less than or equal to a threshold value.

8. The service providing system of claim 7, wherein the at least one server is further configured to move the multipurpose vehicle along the new movement route by another user's consent when the degree of the movement route change according to the determined new movement route exceeds the threshold value.

9. The service providing system of claim 1, wherein the at least one server is further configured to: combine, with each other, multiple multipurpose vehicles in which services are prepared; and allow a combined multipurpose vehicle to provide the services to users while sequentially moving to boarding places and alighting places in the reservation information.

10. The service providing system of claim 9, further comprising a hub configured to provide a place for the multipurpose vehicles to gather when the at least one server combines, with each other, the multiple multipurpose vehicles in which services are prepared, the combination of the multipurpose vehicles being made in the hub.

11. The service providing system of claim 9, wherein the at least one server is further configured to: perform movement route optimization, which includes optimization of a route along which the multipurpose vehicles, in which services are prepared, move to be combined with each other for service providing through the combined multipurpose vehicles and optimization of a route along which the combined multipurpose vehicles pick up users; and move the multipurpose vehicles along the optimized movement routes.

12. The service providing system of claim 1, wherein the at least one server is further configured to: determine, when a person attempts to board the vehicle, whether the user in the reservation information received from the at least one server matches the person attempting to board; and allow the person to board the vehicle when the user matches the person attempting to board.

13. The service providing system of claim 12, wherein the at least one server is further configured to determine a user identification means of the user when determining whether the user in the reservation information matches the person attempting to board.

14. The service providing system of claim 1, wherein the at least one server is further configured to transfer an arrival schedule notification to the user terminal before the multipurpose vehicle arrives at the boarding place in the reservation information such that the user is capable of preparing for boarding.

15. A providing method using a multipurpose vehicle, the service providing method comprising:

receiving, by at least one server, reservation information comprising at least one of a user, a service type, a boarding place, an alighting place, or a use time from a user terminal;

matching, by the at least one server, a user and a service provider to each other through the reservation information;

transmitting, by the at least one server, service information including at least one of a service type or a service providing time to a terminal of the matched service provider;

matching, by the at least one server, the matched user and service provider to the multipurpose vehicle by using the reservation information and the service information; and in response to receiving a three-party matching result involving the user, the service provider, and the multipurpose vehicle, controlling, by the at least one server, the matched multipurpose vehicle to move to the service provider in the service information, and subsequently controlling the multipurpose vehicle, in which the service is prepared, to move to a service providing place in the reservation information to allow the user to simultaneously use the vehicle and the service, wherein the service provided by the matched service provider is performed inside the multipurpose vehicle.

16. The service providing method of claim 15, wherein, in the matching of the user, the service provider, and the multipurpose vehicle, the at least one server matches the user and the service provider to a hub through the reservation information and the service information, and selects at least one from among multipurpose vehicles stored by the matched hub.

17. The service providing method of claim 15, wherein, in the allowing of the user to simultaneously use the vehicle and the service, the at least one server: performs movement route optimization, which includes optimization of a route along which the multipurpose vehicle moves to the service provider, optimization of a route on which the multipurpose vehicle having the prepared service picks up the user, and optimization of a route along which the vehicle having picked up the user moves to the alighting place; and moves the multipurpose vehicle along the optimized movement route.

18. The service providing method of claim 15, wherein, in the allowing of the user to simultaneously use the vehicle and the service, the at least one server combines, with each other, multiple multipurpose vehicles in which services are prepared, and allows the combined multipurpose vehicles to provide the services to users while sequentially moving to boarding places and alighting places in the reservation information.

19. The service providing method of claim 15, wherein the allowing of the user to simultaneously use the vehicle and the service comprises:

determining, by the at least one server, whether the user in the reservation information matches a person attempting to board the vehicle when the person attempts to board the vehicle; and allowing, by the at least one server, the person to board the vehicle when the user matches the person attempting to board as a result of the determination.

\* \* \* \* \*